(12) United States Patent
Liu

(10) Patent No.: US 11,715,392 B1
(45) Date of Patent: Aug. 1, 2023

(54) PROJECTION DEVICE

(71) Applicant: Lifang Liu, Shenzhen (CN)

(72) Inventor: Lifang Liu, Shenzhen (CN)

( * ) Notice: Subject to any disclaimer, the term of this patent is extended or adjusted under 35 U.S.C. 154(b) by 0 days.

(21) Appl. No.: 17/676,848

(22) Filed: Feb. 22, 2022

(30) Foreign Application Priority Data

Jan. 17, 2022 (CN) .......................... 202220116365.0

(51) Int. Cl.
| | |
|---|---|
| *G09B 27/04* | (2006.01) |
| *G03B 21/20* | (2006.01) |
| *G03B 21/26* | (2006.01) |
| *F21V 3/02* | (2006.01) |

(52) U.S. Cl.
CPC ................ *G09B 27/04* (2013.01); *F21V 3/02* (2013.01); *G03B 21/20* (2013.01); *G03B 21/26* (2013.01)

(58) Field of Classification Search
None
See application file for complete search history.

(56) References Cited

U.S. PATENT DOCUMENTS

| | | | | |
|---|---|---|---|---|
| 2007/0296922 | A1* | 12/2007 | Lee ........................ | G03B 21/14 |
| | | | | 353/20 |
| 2017/0241623 | A1* | 8/2017 | Zhang ....................... | F21K 9/23 |
| 2019/0078768 | A1* | 3/2019 | Altamura .............. | F21V 23/003 |
| 2022/0065413 | A1* | 3/2022 | Wang .................... | F21V 14/006 |

* cited by examiner

*Primary Examiner* — Bao-Luan Q Le
*Assistant Examiner* — Danell L Owens

(57) ABSTRACT

A projection device comprises first light sources, an interference disk, a condensing lampshade, and a driving device. Both of the interference disk and the condensing lampshade are arranged on light paths of the first light sources. The condensing lampshade is arranged behind the interference disk, and the interference disk is made stationary relative to the first light sources. The driving device drives the condensing lampshade to rotate. When the driving device drives the condensing lampshade to rotate, the projection light emitted after sequentially passing through the interference disk and the condensing lampshade projects an effect of clouds moving. The light paths of the projection light emitted by the first light sources are relatively stable after passing through the interference disk and before entering the condensing lampshade.

18 Claims, 13 Drawing Sheets

PROJECTION DEVICE

TECHNICAL FIELD

The present disclosure relates to a field of projection lamp technology, and in particular to a projection device.

BACKGROUND

A star projection lamp is a projection device that produces dynamic cloud effects. It is often used as an ambient light in homes, cars, entertainment venues, etc.. The star projection lamp generally produces dynamic cloud effects by irradiating light beams on a rotating interference disk, and can even simulate dynamics such as star twinkling.

Chinese Patent No. CN101276523B discloses a projection device for producing a moving starry sky effect and a cloud-like effect that comprises a device for producing the cloud-like effect by adopting at least one incoherent light source, a device for producing the starry sky effect by adopting at least one coherent light source, and a device for regulating and supplying electrical power. The device for producing the cloud-like effect comprises at least one pair of condenser lenses and an interference disk rotated by a motor. The interference disk is arranged between the at least one pair of condenser lenses. The device for producing the starry sky effect comprises a grating disk rotated by the motor and a diffractive optical element positioned between the at least one coherent light source and the grating disk.

The above patent adopts a technical solution in which light directly passes through the rotating interference disk to generate a dynamic cloud effect. Because the interference disk is arranged inside, rotation of the interference disk is unable to be directly observed, making an appearance of the projector lamp rigid and static. Moreover, directly rotation of the interference disk is easy to cause local strong light. The local strong light part is generally too bright and dazzling, which is not conducive to observing dynamic changes of the starry sky effect for a long time.

SUMMARY

A purpose of the present disclosure is to provide a projection device to solve a problem in the prior art that an appearance of a conventional projector lamp is rigid and static and is easy to cause local strong light that is too bright and dazzling, which is not conducive to observing dynamic changes of the starry sky effect for a long time.

To achieve the above purpose, the present disclosure provides a projection device. The projection device comprises first light sources configured to generate projection light, an interference disk arranged on light paths of the first light sources, a condensing lampshade arranged on the light paths of the first light sources and behind the interference disk, and a driving device configured to drive the condensing lampshade to rotate.

The projection light generated by the first light sources generates an interference effect after passing through the interference disk. The projection light generated by the first light sources sequentially passes through the interference disk and the condensing lampshade to emit. When the driving device drives the condensing lampshade to rotate, the projection light emitted after sequentially passing through the interference disk and the condensing lampshade projects an effect of clouds moving.

Furthermore, the driving device comprises a motor and a gear directly or indirectly driven by the motor. The condensing lampshade comprises a tooth portion. The tooth portion comprises meshing teeth engaged with the gear. When the motor drives the gear to rotate, the gear drives the condensing lampshade to rotate through the tooth portion.

Furthermore, the condensing lampshade further comprises a lens portion configured to expand a projection range. The tooth portion is arranged around the lens portion. The meshing teeth are arranged on an inner side wall of the tooth portion.

Furthermore, the condensing lampshade further comprises a lens portion configured to expand a projection range. The tooth portion is arranged around the lens portion. The meshing teeth are arranged on an outer side wall of the tooth portion.

Furthermore, the driving device comprises a motor and a belt drive assembly connecting the motor and the condensing lampshade. The motor drives the condensing lampshade to rotate through the belt drive assembly.

Furthermore, the condensing lampshade further comprises a lens portion configured to expand a projection range and a connecting shaft fixedly connected with the lens portion. The driving device comprises a motor. The motor is directly or indirectly drivingly connected with the connecting shaft.

Furthermore, the projection device further comprises a housing and a mounting bracket. The housing defines a lampshade hole. The mounting bracket is arranged in the housing and is arranged at a position corresponding to a position of the lampshade hole. The condensing lampshade is mounted in the lampshade hole.

Furthermore, an annular rib is arranged on one end of the mounting bracket close to the lampshade hole. An end face of the mounting bracket, the annular rib of the mounting bracket, and an edge of the lampshade hole enclose to form a limit groove. The tooth portion of the condensing lampshade rotates within the limit groove.

Furthermore, side walls of the mounting bracket are enclosed to form a light channel. The first light sources are mounted on a light board. Both of the light board and the interference disk are mounted on the mounting bracket. The light board and the interference disk are separately arranged on two ends of the light channel. The interference disk is arranged on one end of the light channel close to the condensing lampshade.

Furthermore, a partition plate is arranged on the first end of the light channel on which the light board is mounted. The partition plate divides the first end of the light channel into two holes. Two first light sources are arranged on the light board. The two first light sources are separately arranged on the two holes.

Furthermore, the partition plate further comprises a column extending toward the interference disk. The column is arranged between the two first light sources, and the interference disk is mounted on the column.

Furthermore, the motor is mounted on the mounting bracket. The gear is mounted on an output shaft of the motor. A through hole is formed on the mounting bracket. The gear passes through the through hole and is drivably connected with the tooth portion.

Furthermore, the projection device further comprises second light sources and grating sheets disposed on light paths of the second light source. Light generated by the second light sources passes through the grating sheets to generate diffraction spots to project effect of stars.

Compared with the prior art, both of the interference disk and the condensing lampshade are arranged on the light paths of the first light sources, the condensing lampshade is arranged behind the interference disk, and the interference disk is made stationary relative to the first light sources, and the driving device drives the condensing lampshade to rotate, thereby making the light paths of the projection light emitted by the first light sources relatively stable after passing through the interference disk and before entering the condensing lampshade. The effect of cloud moving is realized by the rotation of the condensing lampshade only, so that rotation of the interference disk is effectively avoided. As a result, the appearance of the projection device is not rigid nor static, and the problem that local strong light is too bright and dazzling to observe dynamic changes of the starry sky effect for a long time is solved.

DETAILED DESCRIPTION

Figure 1:
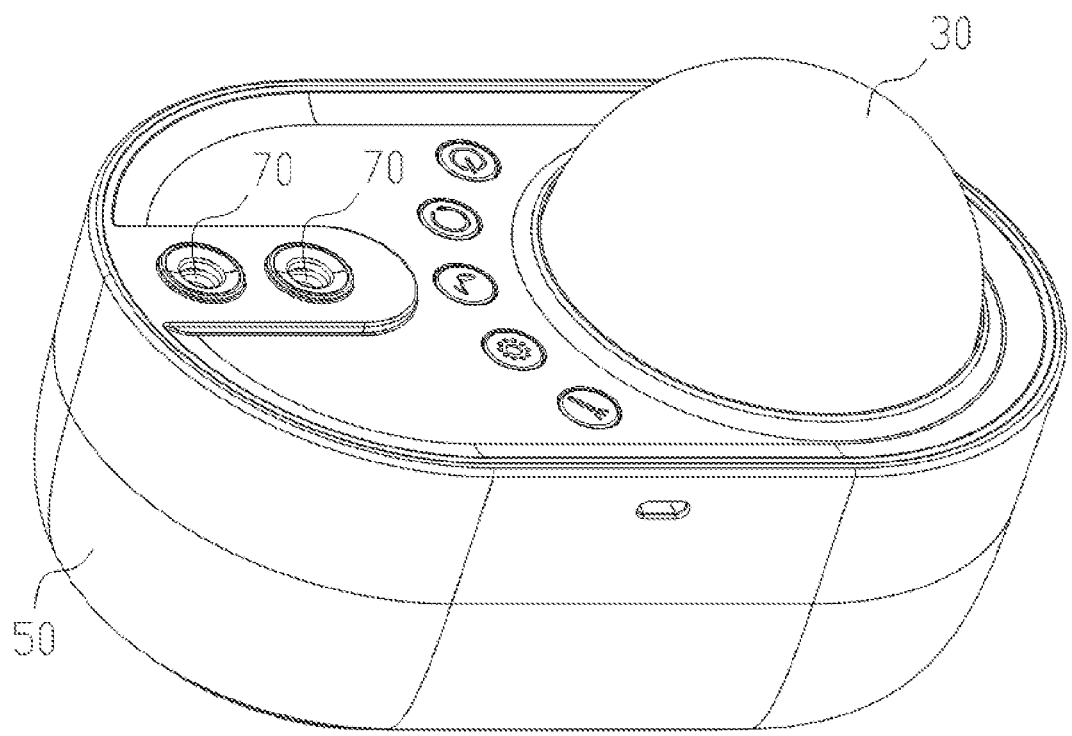
FIG. 1 is a perspective schematic diagram of a projection device according to one embodiment of the present disclosure.

In order to make objectives, technical solutions, and advantages of the present disclosure clearer, the following further describes the present disclosure in detail with reference to accompanying drawings and embodiments. It should be understood that the specific embodiments described here are only used to explain the present disclosure, but not to limit the present disclosure.

It should be noted that in the description of the present disclosure terms such as "central", "horizontal", "upper", "lower", "left", "right", "vertical", "horizontal", "top", "bottom", "inner", "outer", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure. In addition, terms such as "first" ,"second", and "third" are only used for the purpose of description, rather than being understood to indicate or imply relative importance.

In addition, unless otherwise regulated and defined, terms such as "installation," "bonded," and "connection" shall be understood in broad sense, and for example, may refer to fixed connection or detachable connection or integral connection; may refer to mechanical connection or electrical connection; and may refer to direct connection or indirect connection through an intermediate medium or inner communication of two elements. For those of ordinary skill in the art, the meanings of the above terms in the present disclosure may be understood according to concrete conditions.

As shown in FIGS. 1-7, the present disclosure provides a projection device. The projection device comprises first light sources 10, an interference disk 20, a condensing lampshade 30, and a driving device 40. The first light sources 10 are configured to generate projection light. The interference disk 20 is arranged on light paths of the first light sources 10. The projection light generated by the first light sources 10 generates an interference effect after passing through the interference disk 20. The condensing lampshade 30 is arranged on the light paths of the first light sources 10 and behind the interference disk 20. The projection light generated by the first light sources 10 sequentially passes through the interference disk 20 and the condensing lampshade 30 to emit. The driving device 40 is configured to drive the condensing lampshade to rotate. When the driving device 40 drives the condensing lampshade 30 to rotate, the projection light emitted after sequentially passing through the interference disk 20 and the condensing lampshade 30 projects an effect of clouds moving.

Furthermore, the condensing lampshade 30 comprises a lens portion 32 and the lens portion 32 comprises lenses 321. Both of the interference disk 20 and the condensing lampshade 30 are arranged on the light paths of the first light sources 10, the condensing lampshade 30 is arranged behind the interference disk 20, and the interference disk 20 is made stationary relative to the first light sources 10, and the driving device 40 drives the condensing lampshade 30 to rotate, thereby making the light paths of the projection light emitted by the first light sources 10 relatively stable after passing through the interference disk 20 and before entering the condensing lampshade 30. The effect of cloud moving is realized by the rotation of the condensing lampshade 30 only, so that rotation of the interference disk 20 is effectively avoided. As a result, the appearance of the projection device is not rigid nor static, and the problem that local strong light is too bright and dazzling to observe dynamic changes of the starry sky effect for a long time is solved. In order to generate good interference effect, the first light sources 10 are incoherent light sources.

Figure 5:
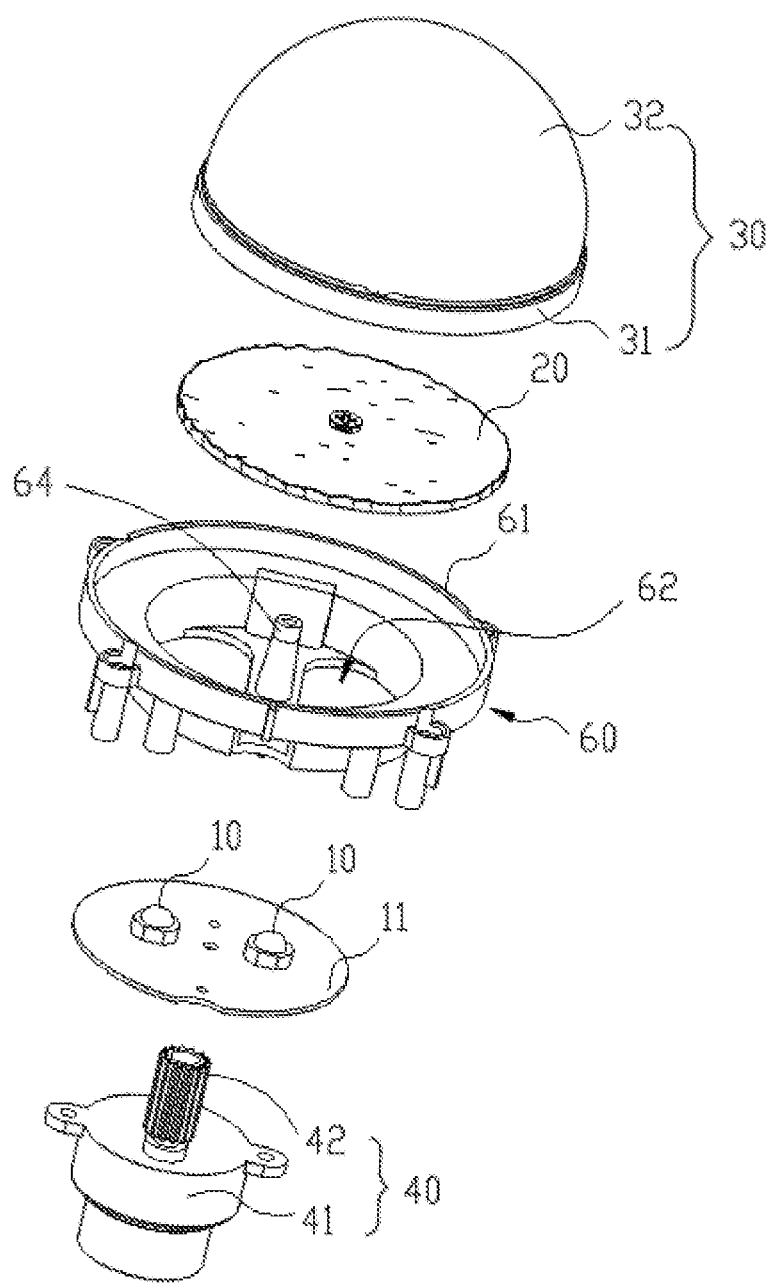
FIG. 5 is another exploded schematic diagram of the core components of the projection device according to one embodiment of the present disclosure.
Figure 6:
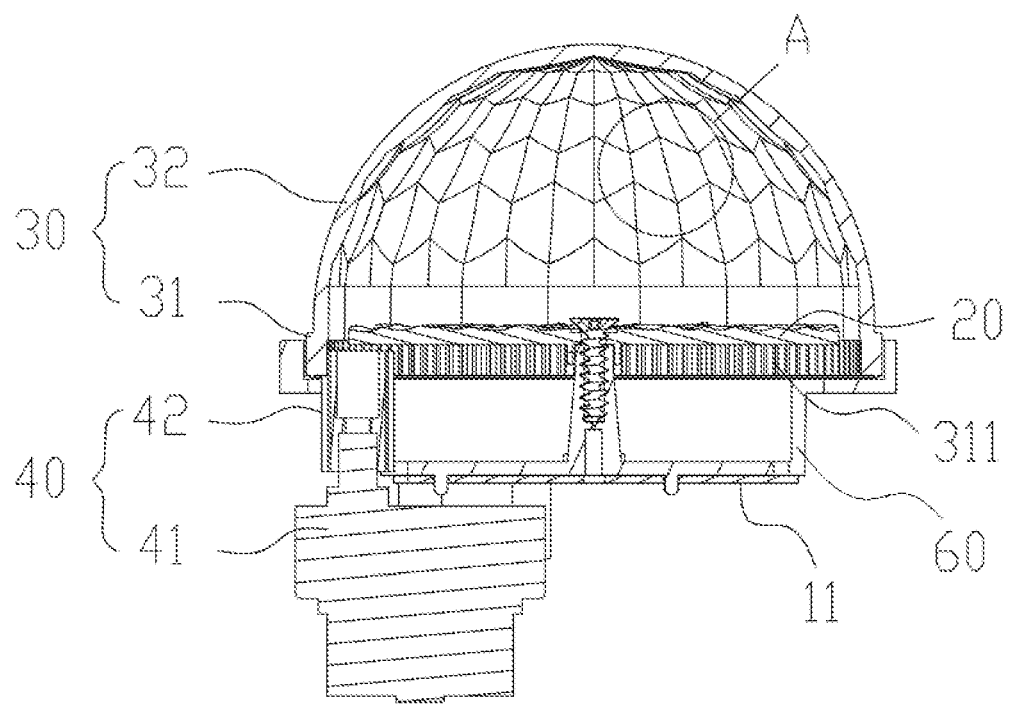
FIG. 6 is a cross-sectional schematic diagram of the core components of the projection device according to one embodiment of the present disclosure.
Figure 7:
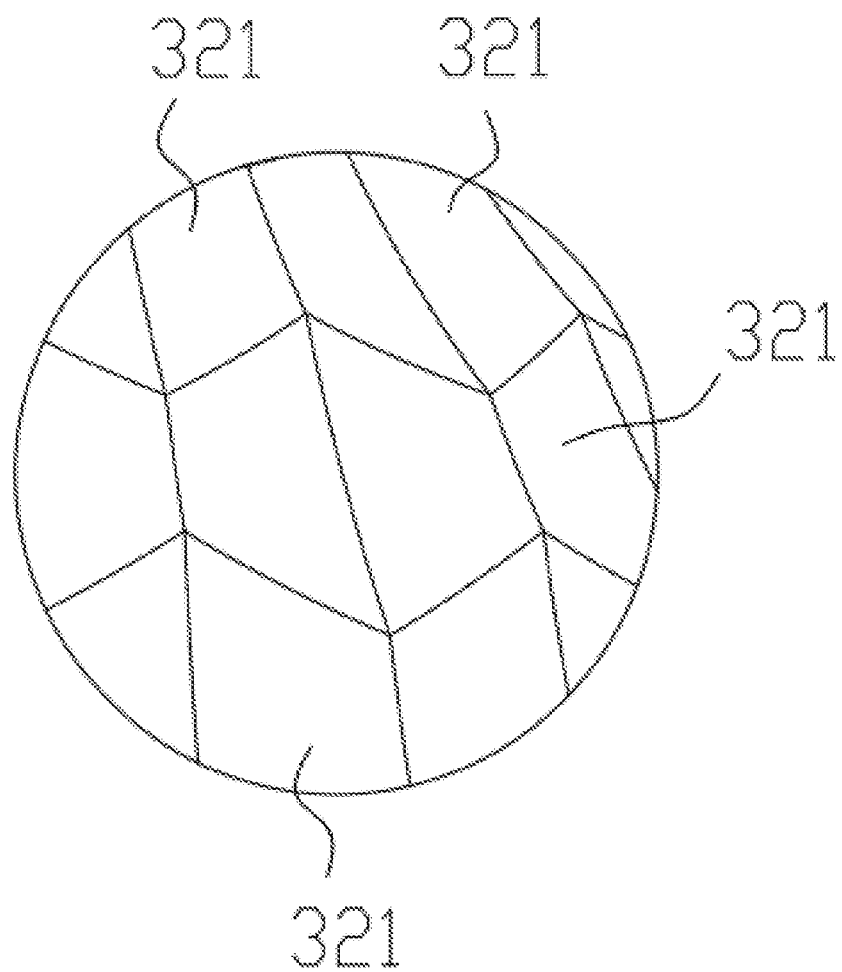
FIG. 7 is an enlarged view of portion A shown in FIG. 6.
Figure 8:
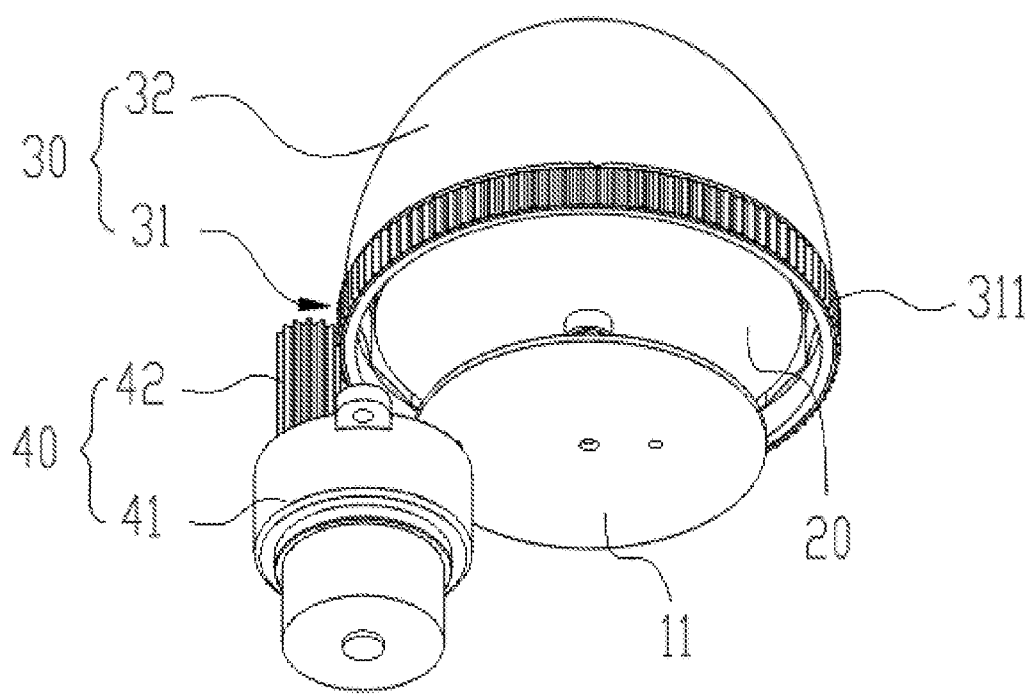
FIG. 8 is a perspective schematic diagram of the core components of the projection device according to another embodiment of the present disclosure.
Figure 9:
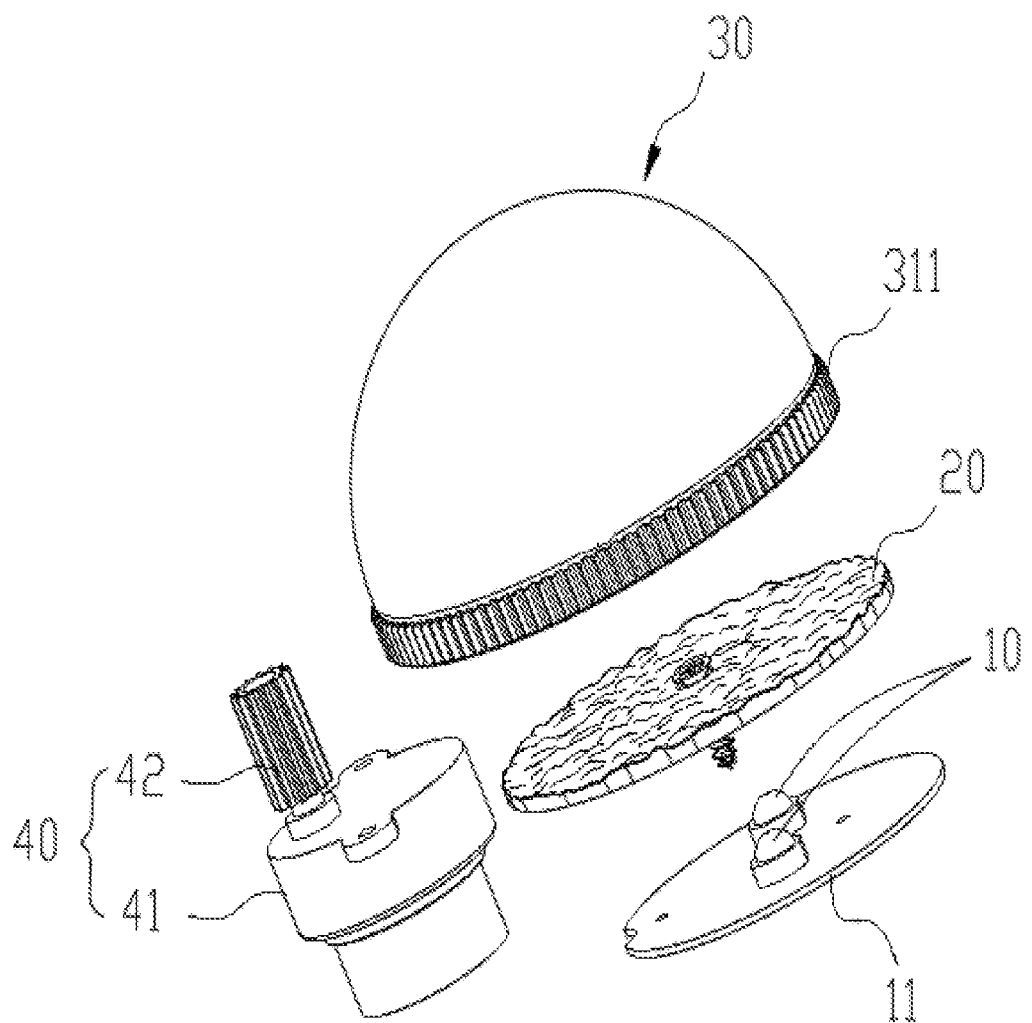
FIG. 9 is an exploded schematic diagram of the core components of the projection device according to another embodiment of the present disclosure.
Figure 10:
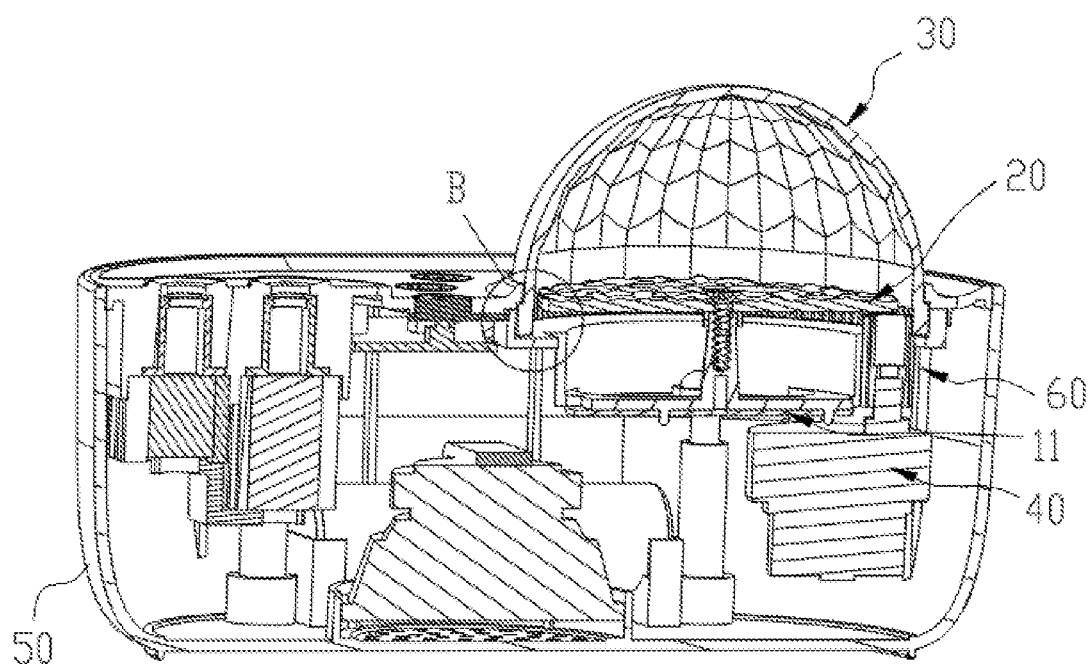
FIG. 10 is a cross-sectional schematic diagram of the projection device according to one embodiment of the present disclosure.
Figure 11:
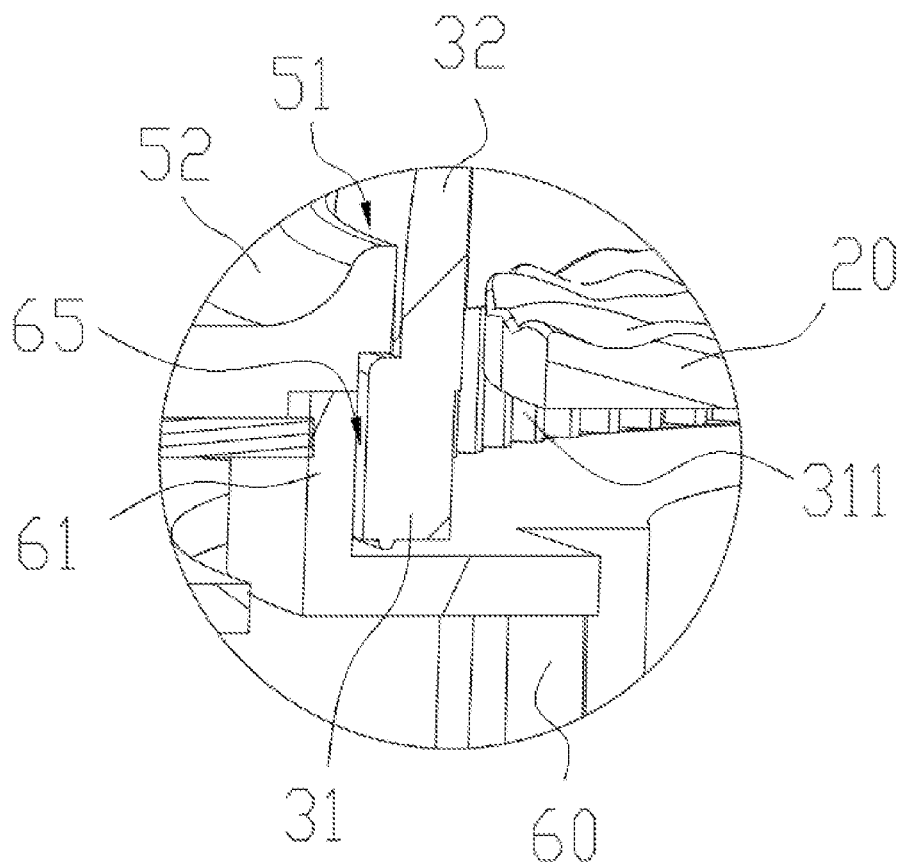
FIG. 11 is an enlarged view of portion B shown in FIG. 10.

As shown in FIG. 5 and FIG. 6, the driving device 40 comprises a motor 41 and a gear 42 directly or indirectly driven by the motor 41. The condensing lampshade 30 comprises a tooth portion 31. The tooth portion 31 comprises meshing teeth 311 engaged with the gear 42. When the motor 41 drives the gear 42 to rotate, the gear 42 drives the condensing lampshade 30 to rotate through the tooth portion 31. For example, the motor 41 is a deceleration motor 41. The gear 42 is directly mounted on an output shaft of the deceleration motor 41. The gear 42 is directly driven by the motor 41. Alternatively, a deceleration gear group is arranged between the motor 41 and the gear 42 and the motor 41 indirectly drives the gear 42 through the deceleration gear group.

As shown in FIGS. 1, 2, and 6-11, in some embodiments, the condensing lampshade 30 further comprises a lens portion 32 configured to expand a projection range. The tooth portion 31 is arranged around the lens portion 32. The meshing teeth 311 are arranged on an inner side wall of the tooth portion 31. In another embodiment, the condensing lampshade 30 further comprises the lens portion 32 configured to expand the projection range. The tooth portion 31 is arranged around the lens portion 32. The meshing teeth 31 are arranged on an outer side wall of the tooth portion 31.

Optionally, the lens portion 32 has a structure of a hollow hemispherical shell formed by a plurality of lenses 321 arranged in a honeycomb shape. The tooth portion 31 is disposed around an open end of the hollow hemispherical shell 32. Furthermore, the projection device further comprises a housing 50 (the housing 50 comprises an upper shell 52 and a lower shell 53) and a mounting bracket 60. The housing 50 defines a lampshade hole 51. The mounting bracket 60 is arranged in the housing 50 and is arranged at a position corresponding to a position of the lampshade hole 51. The condensing lampshade 30 is mounted in the lampshade hole 51 through the mounting bracket 60.

In order to well position a rotation position of the condensing lampshade 30 to present a stable cloud moving effect, an annular rib 61 is arranged on one end of the mounting bracket 60 close to the lampshade hole 51. An end face of the mounting bracket 60, the annular rib 61 of the mounting bracket 60, and an edge of the lampshade hole 51 enclose to form a limit groove 65. The tooth portion 31 of the condensing lampshade 30 rotates within the limit groove 65.

Figure 12:
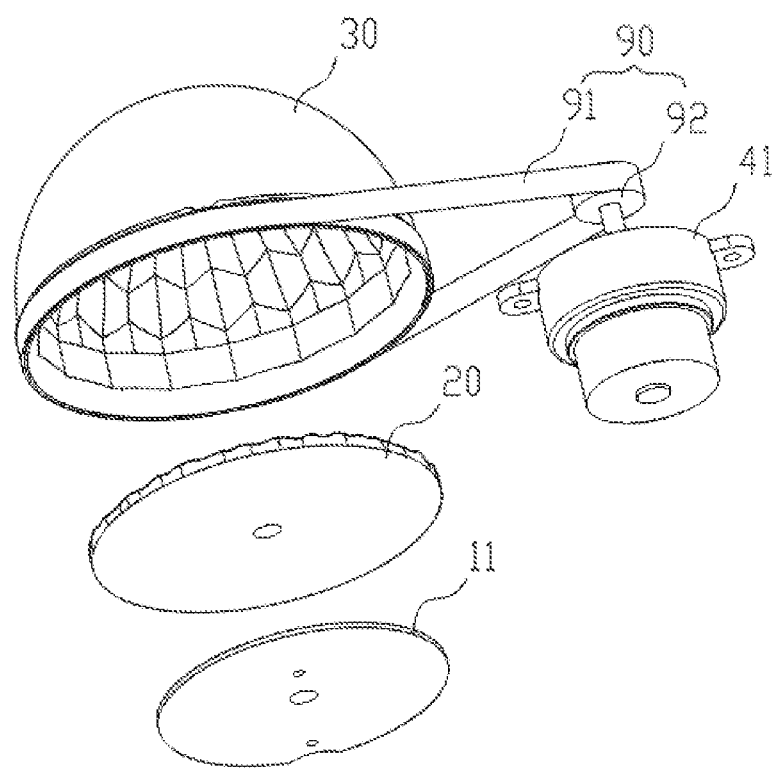
FIG. 12 is an exploded schematic diagram of the core components of the projection device adopting a belt drive method according to one embodiment of the present disclosure.
Figure 13:
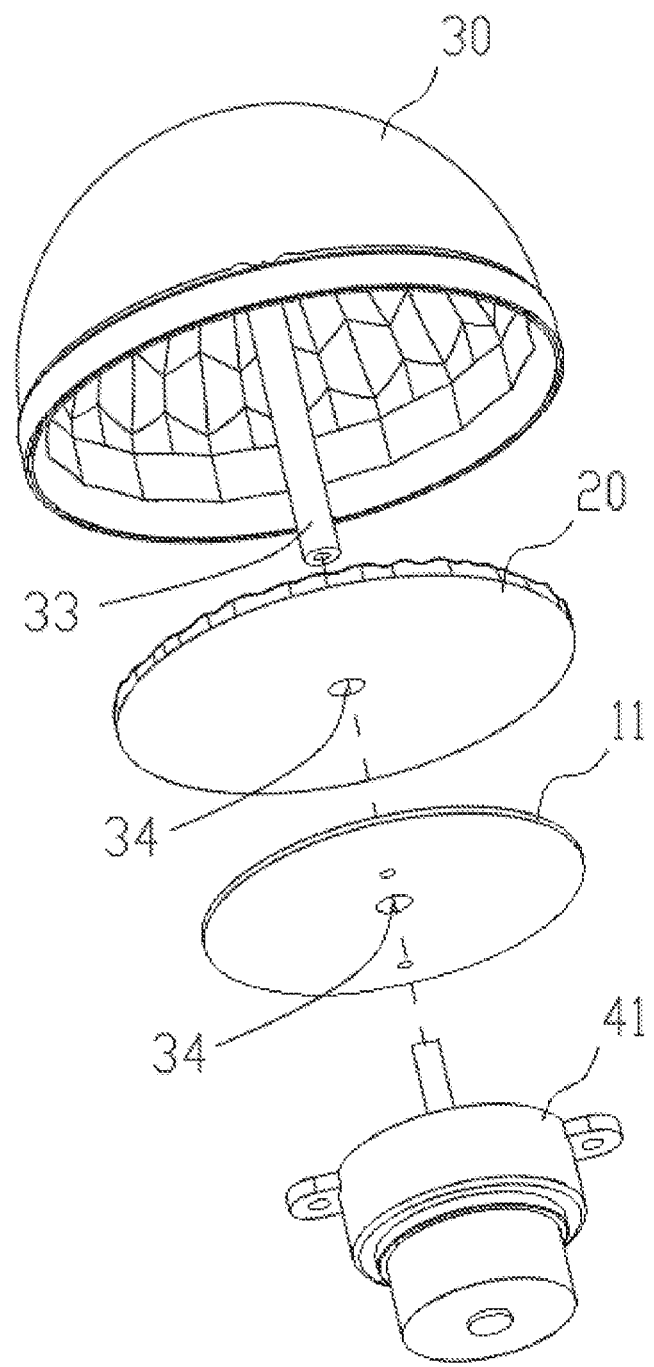
FIG. 13 is an exploded schematic diagram of the core components of the projection device adopting a connecting shaft to connect a motor according to one embodiment of the present disclosure.
Figure 14:
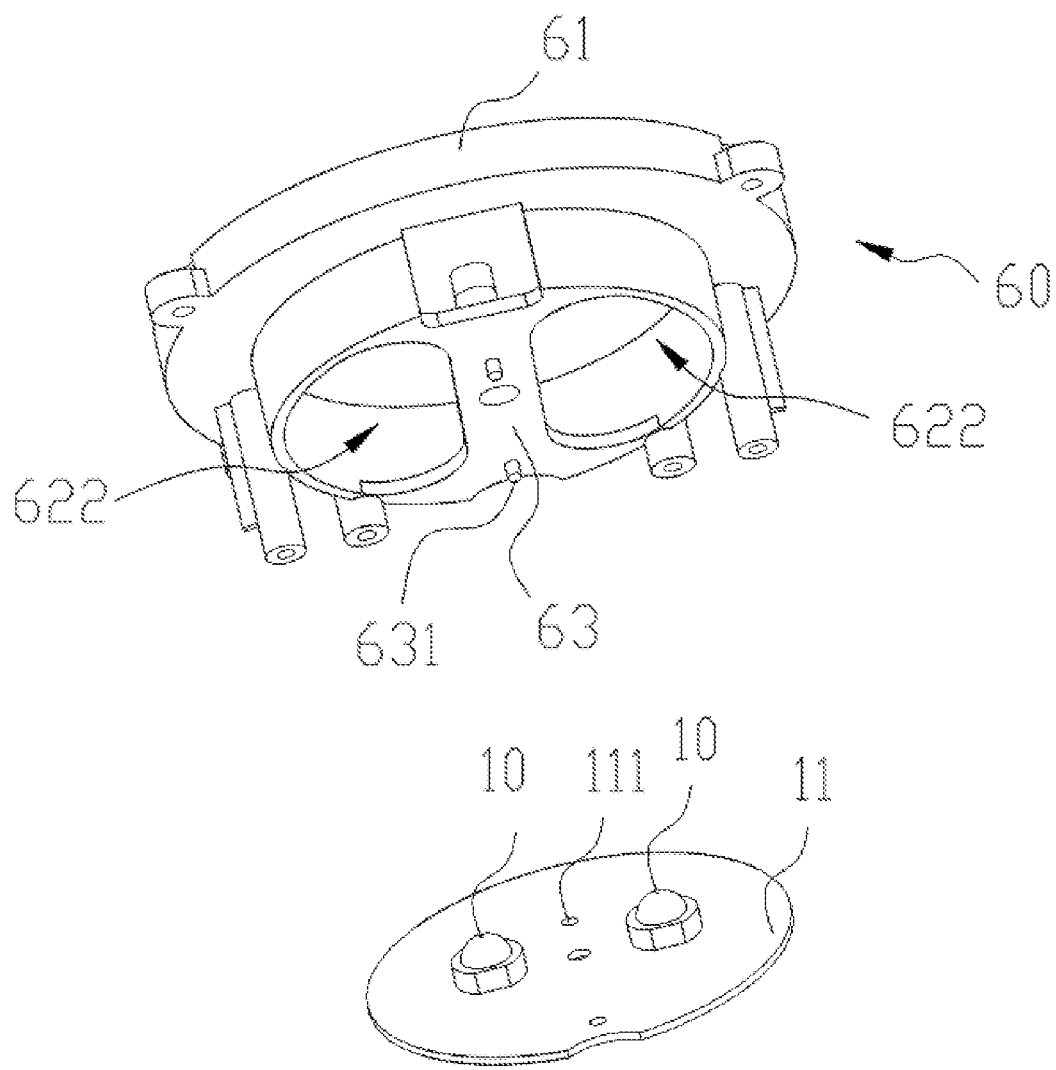
FIG. 14 is an exploded schematic diagram of mounting bracket and light board of the projection device according to one embodiment of the present disclosure.

As shown in FIGS. 12 and 13, in some embodiments, methods of driving the condensing lampshade 30 to rotate are not limited to the way of using the motor 41 and the gear 42, and are realized by other methods. For example, the driving device 40 comprises the motor 41 and a belt drive assembly 90 connecting the motor 41 and the condensing lampshade 30. The motor 41 drives the condensing lampshade 30 to rotate through the belt drive assembly 90 ((e.g. the belt drive assembly 90 comprises a pulley 92 driven by the motor 41 and a belt 91, a belt groove is provided on the condensing lampshade 30, and the belt 91 is connected between the belt groove and the pulley 92). Moreover, the condensing lampshade 30 further comprises the lens portion 32 configured to expand the projection range and a connecting shaft 33 fixedly connected with the lens portion 32. The driving device 40 comprises the motor 41. The motor 41 is directly or indirectly drivingly connected with the connecting shaft 33 (e.g., a center of the light plate 11 and a center of the interference disk 20 define through holes 34, and the connecting shaft 33 passes through the through hole 34 in the center of the light plate 11 and the through hole 34 in the center of the interference disk 20 to connect the output shaft of the motor 41).

As shown in FIGS. 2, 4-6, and 14, in some embodiments, side walls of the mounting bracket 60 are enclosed to form a light channel 62. The first light sources 10 are mounted on a light board 11. Both of the light board 11 and the interference disk 20 are mounted on the mounting bracket 60. The light board 11 and the interference disk 20 are separately arranged on two ends of the light channel 62. The interference disk 20 is arranged on one end of the light channel 62 close to the condensing lampshade 30.

The configuration of the light channel 62 prevents the light from overflowing, and the side wall of the light channel 62 reflects a part of the light into the interference disk 20. Furthermore, a partition plate 63 is arranged on the first end of the light channel 62 on which the light board is mounted. The partition plate 63 divides the first end of the light channel 62 into two holes 622. Two first light sources 10 are arranged on the light board 11. Each of the two first light sources 10 is arranged on a corresponding hole 622. Furthermore, positioning columns 631 are arranged on the partition plate 63. The light board 11 defines positioning holes 111. When the light board 11 is mounted on the partition plate 63, the positioning columns 631 are inserted into the positioning holes 111. The above-mentioned structures make an internal structure of the projection device compact and make a layout reasonable, and are also convenient to assemble and process. Optionally, the mounting bracket 60 is integrally formed by injection molding. Furthermore, a column 64 extending toward the interference disk 20 is arranged on a middle portion of the partition plate 63. The column 64 is arranged between the two first light sources 10. The interference disk 20 is mounted on the column 64. Arrangement of the column 64 not only facilitates mounting of the interference disk 20, but also plays a role of isolating light emitted by one of the two first light sources 10 from the light emitted by the other one of the two first light sources 10 to a certain degree, thereby reducing light mixing of light emitted by the two first light sources 10 close to a light exit end. Therefore, the two first light sources 10 form a double cloud layer effect with clear boundaries.

Furthermore, the motor 41 is mounted on the mounting bracket 60. The gear 42 is mounted on the output shaft of the motor 41. A through hole 66 is formed on the mounting bracket 60. The gear 42 passes through the through hole 66 and is drivably connected with the tooth portion 31.

Figure 2:
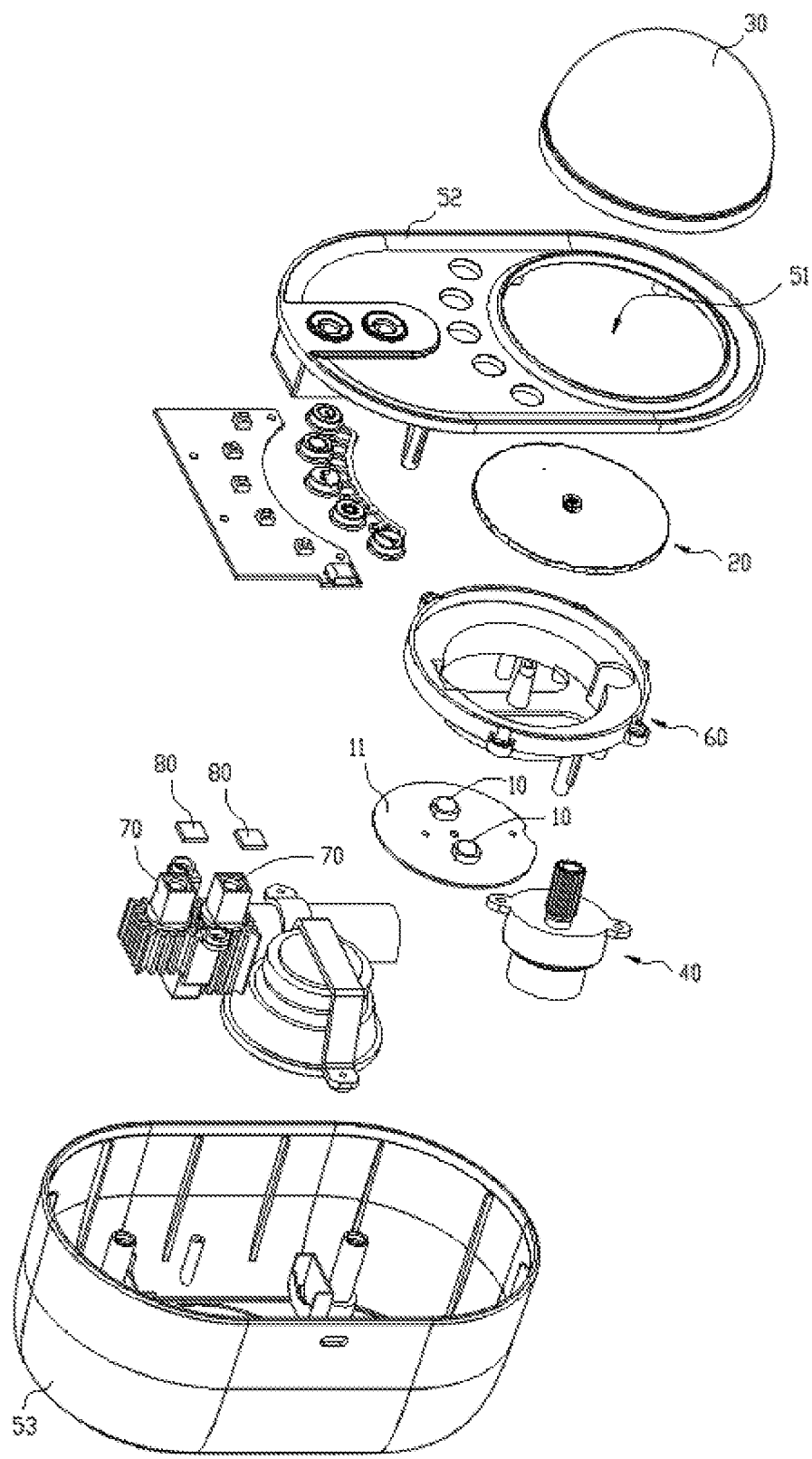
FIG. 2 is an exploded schematic diagram of the projection device according to one embodiment of the present disclosure.
Figure 3:
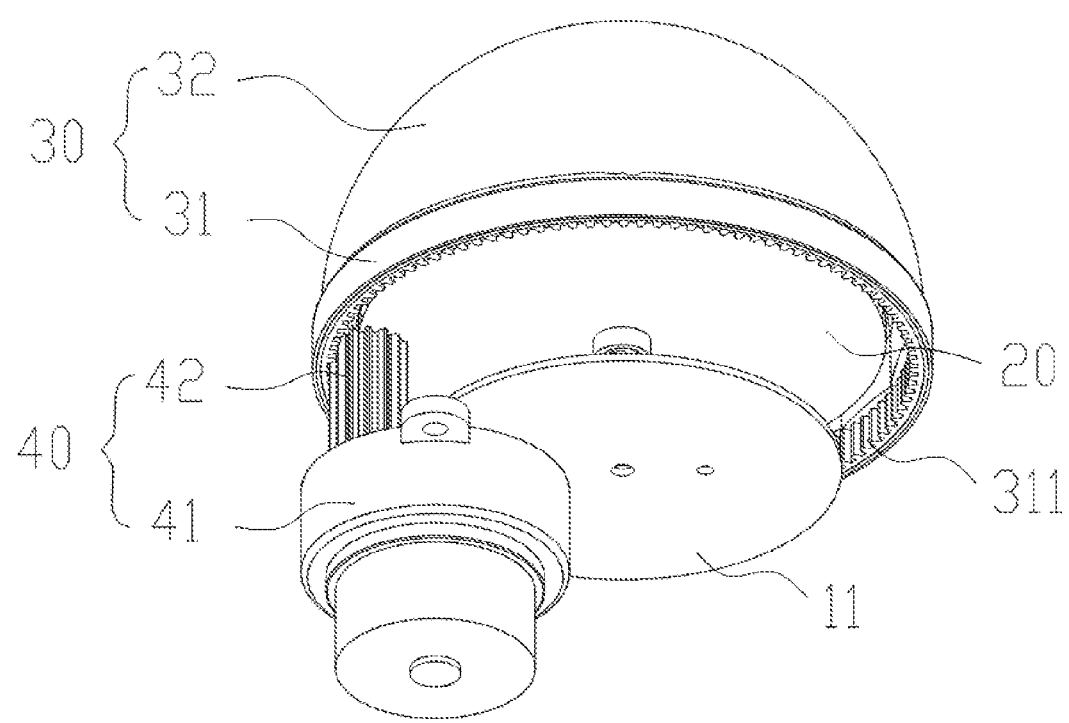
FIG. 3 is a perspective schematic diagram of core components of the projection device according to one embodiment of the present disclosure.
Figure 4:
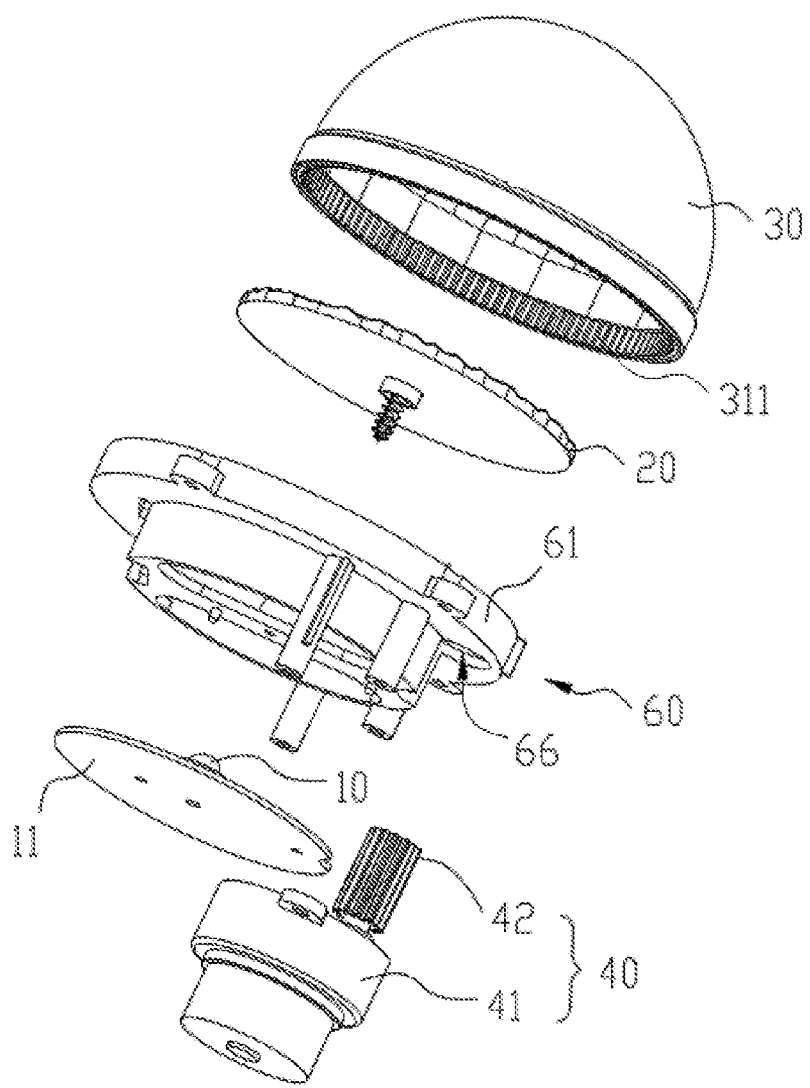
FIG. 4 is an exploded schematic diagram of the core components of the projection device according to one embodiment of the present disclosure.

As shown in FIGS. 1 and 2, in some embodiments, the projection device further comprises second light sources 70 and grating sheets 80 disposed on light paths of the second light source 70. Light generated by the second light sources 70 passes through the grating sheets 80 to generate diffraction spots to project effect of stars. In order to produce a good diffraction effect, the second light sources 70 are coherent light sources, such as a laser.

Foregoing embodiments are only optional embodiments of the present disclosure and are not intended to limit the present disclosure. Any modification, equivalent replacement, or improvement within the technical scope of the present disclosure should be included in the protection scope of the present disclosure.

What is claimed is:

1. A projection device, comprising:
   first light sources configured to generate projection light;
   an interference disk arranged on light paths of the first light sources;
   a condensing lampshade arranged on the light paths of the first light sources and behind the interference disk; and
   a driving device configured to drive the condensing lampshade to rotate;
   wherein the projection light generated by the first light sources generates an interference effect after passing through the interference disk; the projection light generated by the first light sources sequentially passes through the interference disk and the condensing lampshade to emit; when the driving device drives the condensing lampshade to rotate, the projection light emitted after sequentially passing through the interference disk and the condensing lampshade projects an effect of clouds moving;

wherein the condensing lampshade comprises a tooth portion; the projection device further comprises a housing and a mounting bracket; the housing defines a lampshade hole; the mounting bracket is arranged in the housing and is arranged at a position corresponding to a position of the lampshade hole; the condensing lampshade is mounted in the lampshade hole; and wherein an annular rib is arranged on one end of the mounting bracket close to the lampshade hole; an end face of the mounting bracket, the annular rib of the mounting bracket, and an edge of the lampshade hole enclose to form a limit groove; the tooth portion of the condensing lampshade rotates within the limit groove.

2. The projection device according to claim 1, wherein the driving device comprises a motor and a gear directly or indirectly driven by the motor; the tooth portion comprises meshing teeth engaged with the gear; when the motor drives the gear to rotate, the gear drives the condensing lampshade to rotate through the tooth portion.

3. The projection device according to claim 2, wherein the condensing lampshade further comprises a lens portion configured to expand a projection range; the tooth portion is arranged around the lens portion; the meshing teeth are arranged on an inner side wall of the tooth portion.

4. The projection device according to claim 3, wherein side walls of the mounting bracket are enclosed to form a light channel; the first light sources are mounted on a light board, both of the light board and the interference disk are mounted on the mounting bracket; the light board and the interference disk are separately arranged on two ends of the light channel; the interference disk is arranged on one end of the light channel close to the condensing lampshade.

5. The projection device according to claim 4, wherein a partition plate is arranged on the first end of the light channel on which the light board is mounted; the partition plate divides the first end of the light channel into two holes; two first light sources are arranged on the light board; the two first light sources are separately arranged on the two holes.

6. The projection device according to claim 5, wherein the partition plate further comprises a column extending toward the interference disk; the column is arranged between the two first light sources, and the interference disk is mounted on the column.

7. The projection device according to claim 3, wherein the motor is mounted on the mounting bracket; the gear is mounted on an output shaft of the motor; a through hole is formed on the mounting bracket; the gear passes through the through hole and is drivably connected with the tooth portion.

8. The projection device according to claim 2, wherein the condensing lampshade further comprises a lens portion configured to expand a projection range; the tooth portion is arranged around the lens portion; the meshing teeth are arranged on an outer side wall of the tooth portion.

9. The projection device according to claim 8, wherein side walls of the mounting bracket are enclosed to form a light channel; the first light sources are mounted on a light board, both of the light board and the interference disk are mounted on the mounting bracket; the light board is arranged on a first end of the light channel; the interference disk is arranged on a second end of the light channel; the interference disk is arranged on the first end of the light channel close to the condensing lampshade.

10. The projection device according to claim 9, wherein a partition plate is arranged on the first end of the light channel on which the light board is mounted; the partition plate divides the first end of the light channel into two holes; two first light sources are arranged on the light board; the two first light sources are separately arranged on the two holes.

11. The projection device according to claim 10, wherein the partition plate further comprises a column extending toward the interference disk; the column is arranged between the two first light sources, and the interference disk is mounted on the column.

12. The projection device according to claim 8, wherein the motor is mounted on the mounting bracket; the gear is mounted on an output shaft of the motor; a through hole is formed on the mounting bracket; the gear passes through the through hole and is drivably connected with the tooth portion.

13. The projection device according to claim 2, wherein the projection device further comprises second light sources and grating sheets disposed on light paths of the second light sources; light generated by the second light sources passes through the grating sheets to generate diffraction spots to project effect of stars.

14. The projection device according to claim 1, wherein the driving device comprises a motor and a belt drive assembly connecting the motor and the condensing lampshade; the motor drives the condensing lampshade to rotate through the belt drive assembly.

15. The projection device according to claim 1, wherein the condensing lampshade further comprises a lens portion configured to expand a projection range and a connecting shaft fixedly connected with the lens portion; the driving device comprises a motor; the motor is directly or indirectly drivingly connected with the connecting shaft.

16. The projection device according to claim 1, wherein the projection device further comprises second light sources and grating sheets disposed on light paths of the second light sources; light generated by the second light sources passes through the grating sheets to generate diffraction spots to project effect of stars.

17. A projection device, comprising:
first light sources configured to generate projection light;
an interference disk arranged on light paths of the first light sources;
a condensing lampshade arranged on the light paths of the first light sources and behind the interference disk; and
a driving device configured to drive the condensing lampshade to rotate;
wherein the projection light generated by the first light sources generates an interference effect after passing through the interference disk; the projection light generated by the first light sources sequentially passes through the interference disk and the condensing lampshade to emit; when the driving device drives the condensing lampshade to rotate, the projection light emitted after sequentially passing through the interference disk and the condensing lampshade projects an effect of clouds moving;
wherein the projection device further comprises a housing and a mounting bracket; the housing defines a lampshade hole; the mounting bracket is arranged in the housing and is arranged at a position corresponding to a position of the lampshade hole; the condensing lampshade is mounted in the lampshade hole;

wherein side walls of the mounting bracket are enclosed to form a light channel; the first light sources are mounted on a light board, both of the light board and the interference disk are mounted on the mounting bracket; the light board and the interference disk are separately arranged on two ends of the light channel; the interference disk is arranged on one end of the light channel close to the condensing lampshade.

18. A projection device, comprising:

first light sources configured to generate projection light;

an interference disk arranged on light paths of the first light sources;

a condensing lampshade arranged on the light paths of the first light sources and behind the interference disk; and a driving device configured to drive the condensing lampshade to rotate;

wherein the projection light generated by the first light sources generates an interference effect after passing through the interference disk; the projection light generated by the first light sources sequentially passes through the interference disk and the condensing lampshade to emit; when the driving device drives the condensing lampshade to rotate, the projection light emitted after sequentially passing through the interference disk and the condensing lampshade projects an effect of clouds moving;

wherein the driving device comprises a motor and a gear directly or indirectly driven by the motor; the condensing lampshade comprises a tooth portion; the tooth portion comprises meshing teeth engaged with the gear; when the motor drives the gear to rotate, the gear drives the condensing lampshade to rotate through the tooth portion;

wherein the projection device further comprises a housing and a mounting bracket; the housing defines a lampshade hole; the mounting bracket is arranged in the housing and is arranged at a position corresponding to a position of the lampshade hole; the condensing lampshade is mounted in the lampshade hole; and wherein the motor is mounted on the mounting bracket; the gear is mounted on an output shaft of the motor; a through hole is formed on the mounting bracket; the gear passes through the through hole and is drivably connected with the tooth portion.

\* \* \* \* \*